United States Patent
Adams et al.

[19]

[11] Patent Number: 5,906,324
[45] Date of Patent: May 25, 1999

[54] SINGLE REEL TAPE CARTRIDGE WITH INTEGRAL TAPE GUIDE

[75] Inventors: George Frederick Adams; Armando Jesus Argumedo; Edwin Ralph Childers, all of Tucson, Ariz.

[73] Assignee: International Business Machines Corporation, Armonk, N.Y.

[21] Appl. No.: 09/071,154

[22] Filed: May 4, 1998

[51] Int. Cl.⁶ .................................................. G03B 1/58
[52] U.S. Cl. .................................. 242/332.8; 242/348.2; 360/132
[58] Field of Search .................................. 242/346, 345, 242/347, 347.1, 348, 532.6, 332.8, 332.4, 348.2; 360/132, 95

[56] References Cited

U.S. PATENT DOCUMENTS

| | | | |
|---|---|---|---|
| 4,175,719 | 11/1979 | Speckman et al. | 242/348 |
| 4,426,047 | 1/1984 | Richard et al. . | |
| 4,452,406 | 6/1984 | Richard . | |
| 4,465,248 | 8/1984 | Rotter . | |
| 4,477,851 | 10/1984 | Dalziel et al. | 360/95 |
| 4,555,077 | 11/1985 | Platter et al. . | |
| 4,646,177 | 2/1987 | Sanford et al. | 360/95 |
| 4,738,408 | 4/1988 | Odaka et al. . | |
| 5,155,639 | 10/1992 | Platter et al. | 360/95 |
| 5,209,424 | 5/1993 | Fischer et al. | 242/348 |
| 5,297,755 | 3/1994 | Felde et al. . | |
| 5,431,356 | 7/1995 | Horstman et al. | 242/348.2 |
| 5,433,395 | 7/1995 | Turgeon et al. | 242/336 |
| 5,492,284 | 2/1996 | Sorensen | 242/348.2 |
| 5,547,142 | 8/1996 | Cheatham et al. | 242/338.1 |
| 5,618,005 | 4/1997 | Todd et al. | 242/345.1 |
| 5,786,967 | 7/1998 | Gerfast et al. | 360/132 |

FOREIGN PATENT DOCUMENTS

| 502363 | 2/1976 | U.S.S.R. | 242/348 |
|---|---|---|---|

*Primary Examiner*—Donald P. Walsh
*Assistant Examiner*—William Rivera
*Attorney, Agent, or Firm*—John H. Holcombe; Robert M. Sullivan

[57] ABSTRACT

Disclosed is a single reel tape cartridge having a supply reel positioned within a central cavity of a shell. The supply reel is coupled to the attachment end of a length of recording tape which is wound in a sequence of wraps from an inner circumference to a maximum outer circumference when the length of recording tape is fully wound on the supply reel. A tape guide and bearing assembly positioned within the central cavity closely adjacent the maximum outer circumference, faces towards an aperture in the shell and away from the supply reel. The tape guide and bearing assembly defines a tape path for the outermost wrap from the supply reel to the tape guide and bearing assembly, across an aperture in the shell for interfacing the outermost wrap with the tape head of the tape drive at the aperture. The tape path then extends to an isolator, e.g. the supply reel, for isolating the tape path at the tape guide and bearing assembly from the free end of the length of recording tape as the free end is wound at a take up reel in the drive. A stable head to tape interface is thus provided at the cartridge tape guide and bearing assembly, which allows a small form factor tape drive having a short tape path to the take up reel.

22 Claims, 5 Drawing Sheets

SINGLE REEL TAPE CARTRIDGE WITH INTEGRAL TAPE GUIDE

TECHNICAL FIELD

This invention relates to single reel cartridges for recording tape, and, more particularly, for providing a stable head to tape interface.

BACKGROUND OF THE INVENTION

Conventional single reel cartridges for recording tape comprise a flattened, generally square box-like shell with a single supply reel of recording tape centrally located in the shell. The length of recording tape is attached at one end to the supply reel and the other end is a free end which is attached to a leader block. The leader block is drawn from the cartridge by a tape drive threader which moves the tape through an elongated tape path in the drive, past tape bearings and guides, a tape read/write head, more tape bearings and guides, and to a take up reel.

Typically, the tape winds onto reels in a non-uniform profile which results in lateral tape motion at the head and tape guides when the tape is unwound at typical tape speeds. Thus, tape bearings and guides are required to insure that the tape is stable when it passes the head in order to meet design requirements for data density and performance.

It is desirable to provide high capacity and high performance tape drives. One means of increasing capacity is to reduce the thickness of the recording tape to permit a greater length of tape to be stored in a tape cartridge, but this leads to increased susceptibility to vibration and decreased stability of the tape, and requires a more stable tape path. As described in U.S. Pat. No. 5,155,639, Platter et al., care must be taken to develop a proper tape path between the supply and take up reels, and across the tape read/write head, to assure proper registration of the tape with the tape head. As the result, conventional tape paths are long and cumbersome and expensive. It is also desirable to reduce the size of the tape drive while retaining stability of the tape. The '639 patent reduced the size of the tape drive to an 8 inch form factor by employing an improved tape threading mechanism and an improved take up reel in the drive.

It is also desirable to provide such tape drives in even smaller form factors. To do so, requires a smaller tape path.

SUMMARY OF THE INVENTION

It is an object of the present invention to provide a single reel cartridge for recording tape which provides a stable head to tape interface and which allows an associated tape drive to have a small form factor.

Disclosed is a single reel tape cartridge having a shell defining a central cavity, and having a supply reel positioned within the central cavity, the supply reel coupling the attachment end of a length of recording tape and for winding the length of recording tape about a central axis in a sequence of wraps from an inner circumference to a maximum outer circumference when the length of recording tape is fully wound on the supply reel. A tape guide and bearing assembly is positioned within the central cavity of the shell and closely adjacent the maximum outer circumference. The tape bearing assembly faces towards a first aperture in the shell and away from the central axis of the supply reel. The tape guide and bearing assembly defines a tape path for the outermost wrap of the length of recording tape from the supply reel to the tape guide and bearing assembly, across the first aperture in the shell for interfacing the outermost wrap of the length of recording tape with the tape head of the tape drive at the aperture. An isolator is provided for additionally defining the tape path subsequent to the tape guide and bearing assembly for isolating the tape path at the tape guide and bearing assembly from the free end of the length of recording tape as the free end is wound at a take up reel in the drive.

In one embodiment, the isolator comprises the supply reel, whereby the defined tape path subsequent to the tape guide and bearing assembly extends from the tape guide and bearing assembly back to the supply reel, for isolating the tape path.

In another embodiment, the isolator comprises a bearing affixed to the shell.

The tape guide and bearing assembly, and the isolator, may comprise roller guides.

The single reel tape cartridge shell includes a bottom alignment plate, wherein the supply reel is disposed for rotation on the bottom alignment plate. The tape guide and bearing assembly is also positioned on the bottom plate, so that the supply reel, the tape guide and bearing assembly, and the isolator are aligned with respect to each other.

As the result, a stable head to tape interface is provided at the tape guide and bearing assembly within the tape cartridge, which allows an associated tape drive to have a small form factor since the only tape path in the tape drive is a short tape path to the take up reel.

For a fuller understanding of the present invention, reference should be made to the following detailed description taken in conjunction with the accompanying drawings.

DETAILED DESCRIPTION OF THE INVENTION

Figure 1:
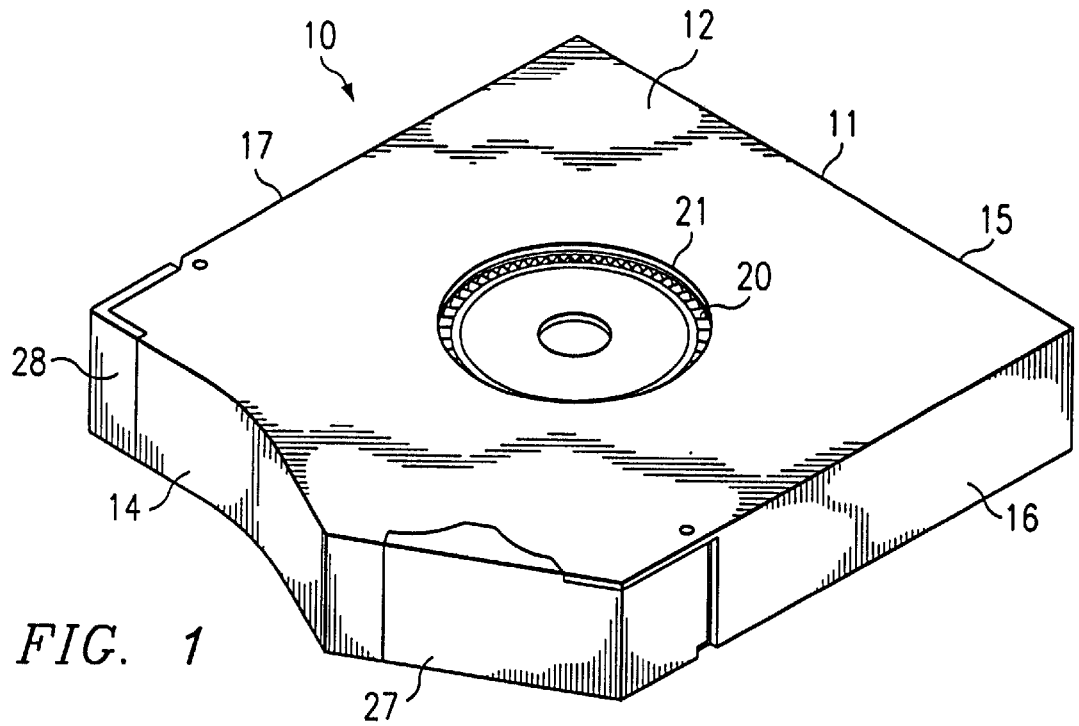
FIG. 1 is an isometric view of a single reel tape cartridge in accordance with the present invention.
Figure 2:
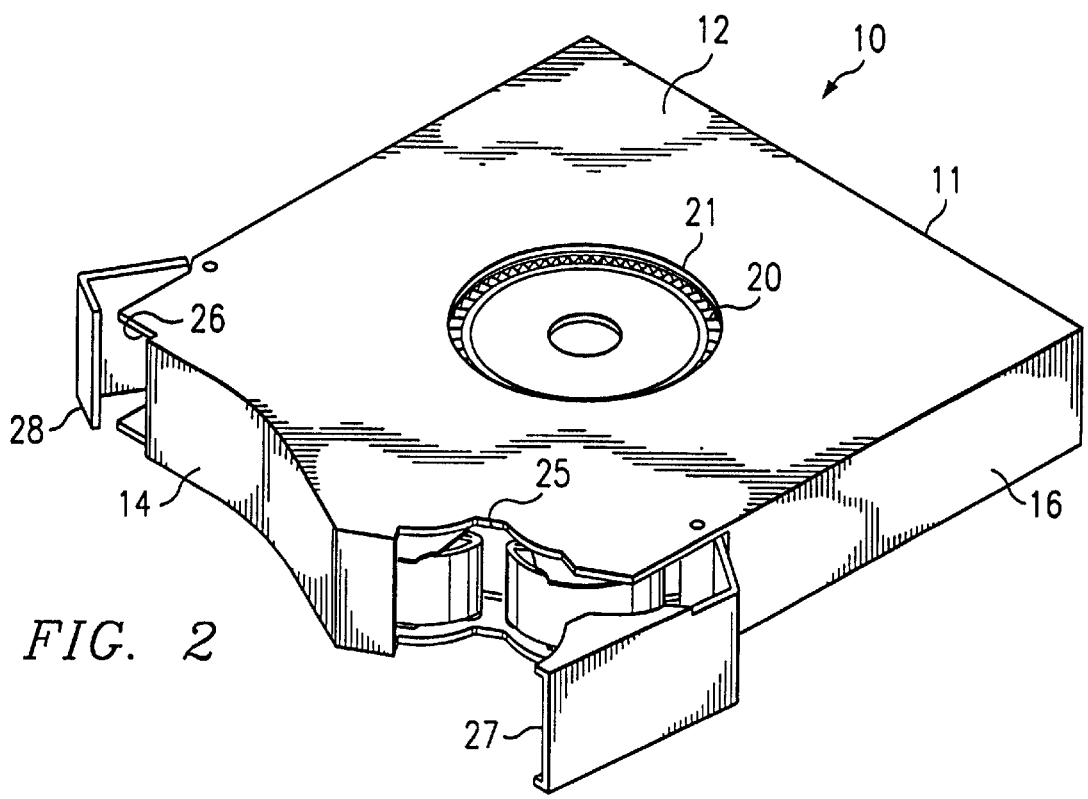
FIG. 2 is an isometric view of the single reel tape cartridge of FIG. 1 with its access doors open.
Figure 3:
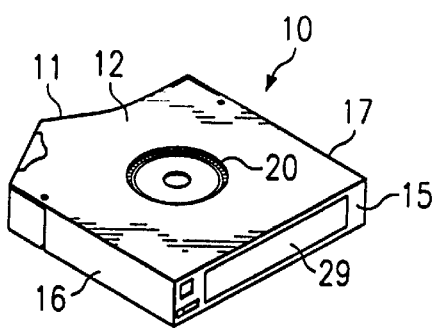
FIG. 3 is an isometric view of the single reel tape cartridge of FIGS. 1 and 2 from the side opposite the access doors.

Referring to FIGS. 1, 2 and 3, a single reel tape cartridge 10 is illustrated for housing a length of recording tape wound on a supply reel for removable insertion in a tape drive. The cartridge includes a box-like shell 11 formed by a cover 12, an alignment plate (not shown) on the side opposite cover 12, and four outer side walls 14, 15, 16 and 17 in a generally rectangular arrangement. A supply reel (not shown) is centrally disposed in the cartridge between the four outer side walls, and the supply reel has a drive coupling 20 accessible at aperture 21 in cover 12 for removably coupling to a reel drive of the tape drive.

An aperture 25 is provided in the cartridge shell 11 for interfacing with a tape head of the tape drive, as will be explained. Another aperture 26 is provided in the cartridge shell 11 providing an interface with the tape drive to allow a threader to engage a leader block (not shown) at the free end of the length of recording tape. The tape drive threader will transport the free end of the length of recording tape to a take up reel for unwinding the length of recording tape. Access doors 27 and 28 may cover the apertures 25 and 26, respectively, and may be pivoted, for example, by the tape drive, to expose the inside of the tape cartridge 10. A bar code or label area 29 may be provided at the side 15 of the cartridge.

Figure 4:
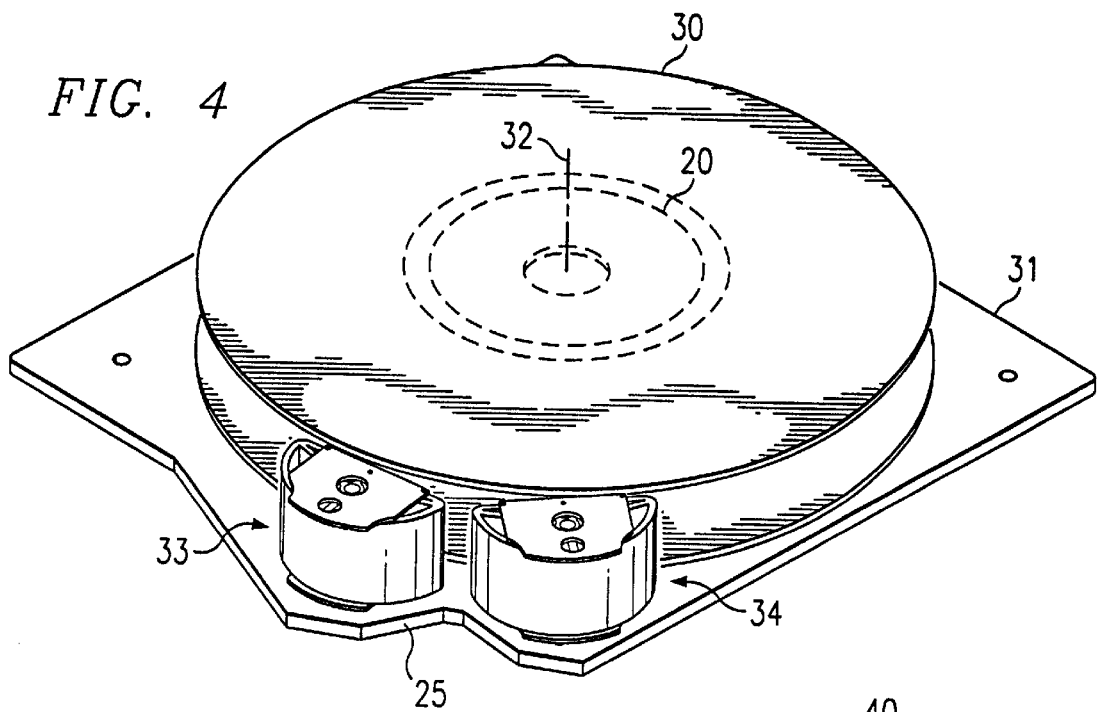
FIG. 4 is an isometric view of the interior of the single reel tape cartridge of FIGS. 1–3.

Referring additionally to FIG. 4, which illustrates the interior of the single reel tape cartridge of FIGS. 1–3, a supply reel 30 is disposed for rotation on a bottom alignment plate 31. The supply reel couples the attachment end of a length of recording tape (not shown) and, when driven by the tape drive reel drive (the reel drive coupling 20 of FIGS. 1–3 is shown in phantom), winds the length of recording tape about a central axis 32 in a sequence of wraps from an inner circumference to a maximum outer circumference when the length of recording tape is fully wound on the supply reel 30.

In accordance with the present invention, a tape guide and bearing assembly, for example, comprising a tape guide and bearing 33 and a tape guide and bearing 34, is positioned on the bottom alignment plate and on each side of the first aperture 25 of the cartridge shell, and closely adjacent the maximum outer circumference of the length of recording tape mounted on supply reel 30. Thus, the tape guide and bearing assembly is positioned to define a tape path at the first aperture for interfacing with the tape head of the tape drive. By positioning the tape and guide bearing assembly on the bottom alignment plate 31, the supply reel 30 and the tape guide and bearing assembly 33, 34 are aligned with respect to each other in the axial direction.

Figure 5A:
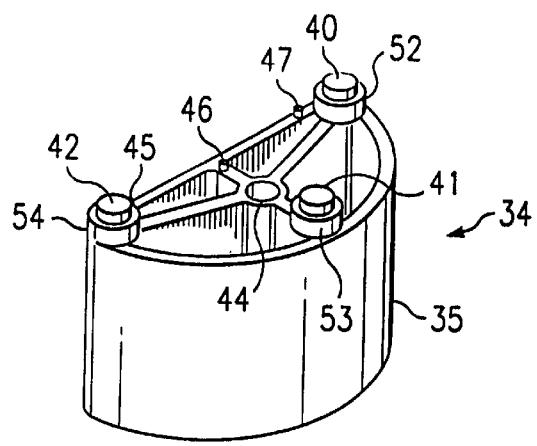
FIGS. 5A, 5B and 5C are isometric views of a tape guide and bearing assembly of the present invention, shown in various orientations and in states of assembly.
Figure 5B:
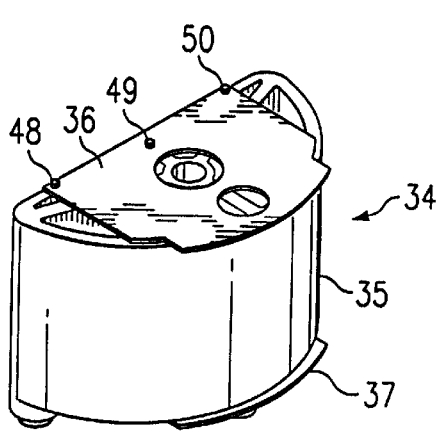
Figure 5C:
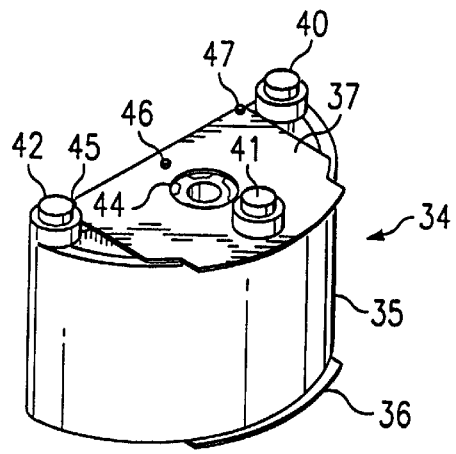

One of the tape guides and bearings 33, 34 is illustrated in FIGS. 5A–5C. FIG. 5A illustrates a bottom isometric view of a tape guide and bearing, for example, tape guide and bearing 34, having tape bearing 35 without tape guides; FIG. 5B illustrates a top isometric view of the tape bearing 35 and tape guides 36 and 37; and FIG. 5C illustrates a bottom isometric view of the tape bearing 35 and guides 36 and 37. Pins 40, 41 and 42 are provided on tape bearing 35 to precisely locate and position the tape bearing on the alignment plate 31. The tape bearing may be affixed to the bottom alignment plate, for example, by means of screws at each of the pins, or at the opening 44 and by a nut at the opposite end of the opening. Alternatively, the pins 40, 41 and 42 may snap into the alignment plate, or cement may be utilized. Pins 45, 46 and 47 align and affix tape guide 37 to the tape bearing 35, and pins 48, 49 and 50 align and affix tape guide 36 to the opposite side of the tape bearing 35. Shoulders 52, 53 and 54 on the pins 40, 41 and 42 provide the appropriate axial spacing of the tape guide and bearing 34 from the alignment plate 31 to equal that of the supply reel 30 and thereby attain the alignment of the tape guide and bearing 34 with respect to the supply reel 30 in the axial direction.

Figure 6:
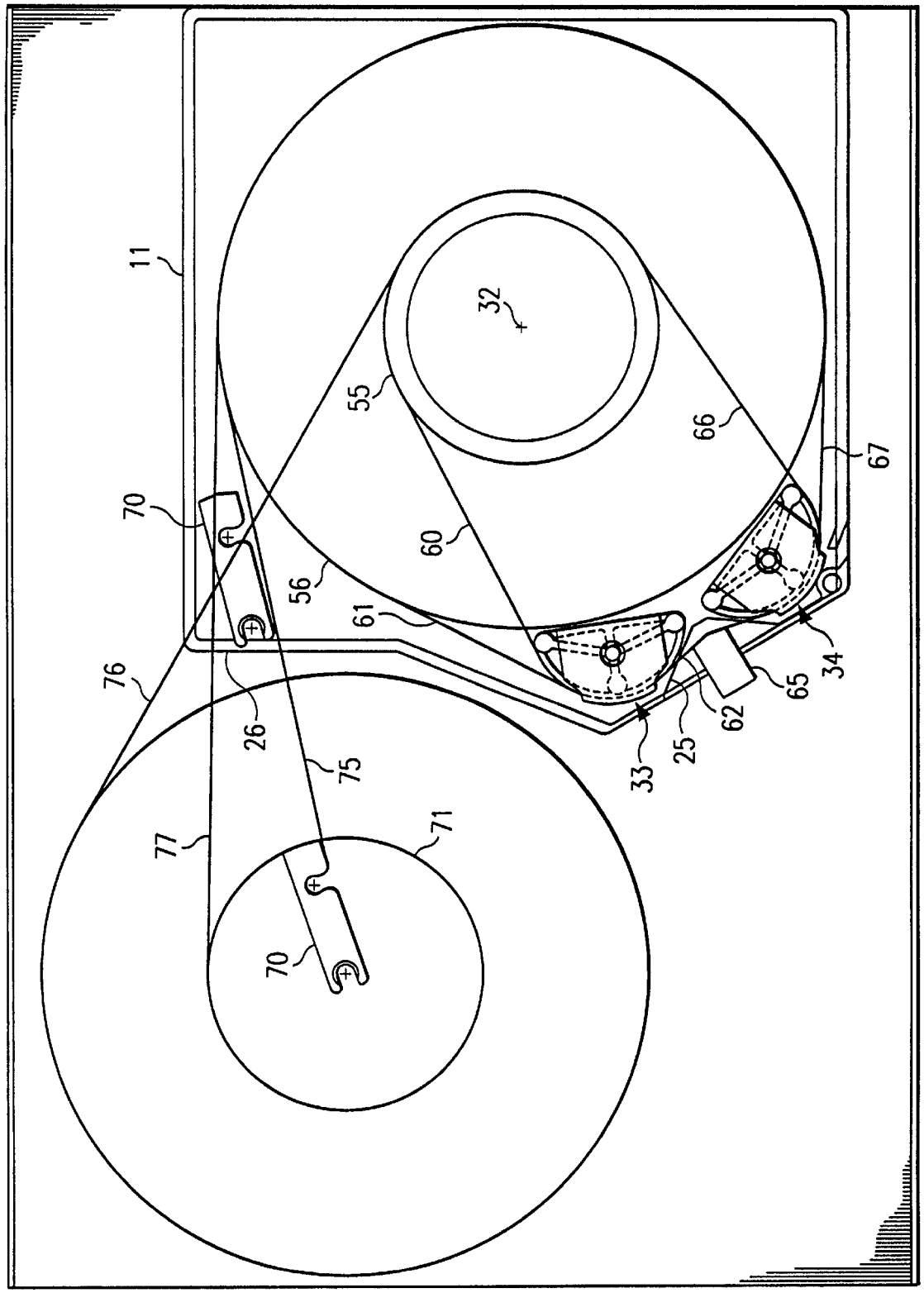
FIG. 6 is a plan diagrammatic view of the single reel tape cartridge of FIGS. 1–3 as inserted into a tape drive.

Referring additionally to FIG. 6, the tape guide and bearing assembly 33, 34 faces towards the aperture 25 in the shell 11 and away from the central axis 32 of the supply reel 30. A length of recording tape is illustrated both at a minimum inner circumference 55 of wrap on the supply reel, and at a maximum outer circumference 56 when the length of recording tape is fully wound on the supply reel 30. The tape guide and bearing assembly 33, 34 defines a tape path 60, 61 for the outermost wrap of the length of recording tape from the supply reel to the tape guide and bearing assembly, and a constant tape path 62 across the aperture 25 in the shell for interfacing the outermost wrap of the length of recording tape with a tape head 65 of the tape drive at the aperture.

In accordance with the present invention, an isolator is provided for additionally defining the tape path subsequent to the tape guide and bearing assembly for isolating the tape path at the tape guide and bearing assembly from the free end of the length of recording tape as the free end is wound at a take up reel in the drive. The isolator may take several forms. In the embodiment of FIG. 6, the isolator comprises the supply reel 30 in that the tape path 66, 67 from the tape guide and bearing assembly 33, 34 extends back to the supply reel, and specifically the outermost wrap 55, 56 of the length of recording tape on the supply reel, for isolating the tape path.

As the result of the supply reel isolator, the tape guide and bearing assembly, and the precision alignment of the supply reel and the tape guide and bearing assembly, a stable head to tape interface is provided at the tape guide and bearing assembly 33, 34 within the tape cartridge.

The recording tape free end additionally comprises a leader block 70 for interfacing with a threader (not shown) of the tape drive. The aperture 26 in the cartridge shell 11 supports the leader block 70 when the length of recording tape is fully wound on the supply reel 30. The aperture provides an interface with the tape drive to allow the tape drive threader to engage the leader block of the length of recording tape thereat and to thread the length of recording tape to a take up reel 71.

The threader only has to move the recording tape a short distance to the take up reel 71, as opposed to threading the tape along a set of tape bearings and guides and a tape head and then to a take up reel of a conventional tape drive and a conventional tape cartridge. Thus, a simplified threader may be employed in the tape drive. Three tape paths are illustrated in FIG. 6 from the supply reel isolator to the leader block 70 in the tape drive. Tape path 75 illustrates the initial threading of the leader block 70 to the take up reel 71. Tape path 76 illustrates the recording tape from the supply reel isolator at the minimum inner circumference 55 of wrap on the supply reel, and tape path 77 illustrates the recording tape from the supply reel isolator at the maximum outer circumference 56 when the length of recording tape is fully wound on the supply reel 30.

As the result, a stable head to tape interface is provided at the tape guide and bearing assembly within the tape cartridge, which allows an associated tape drive to have a small form factor since the only tape path in the tape drive is a short tape path to the take up reel.

Figure 7:
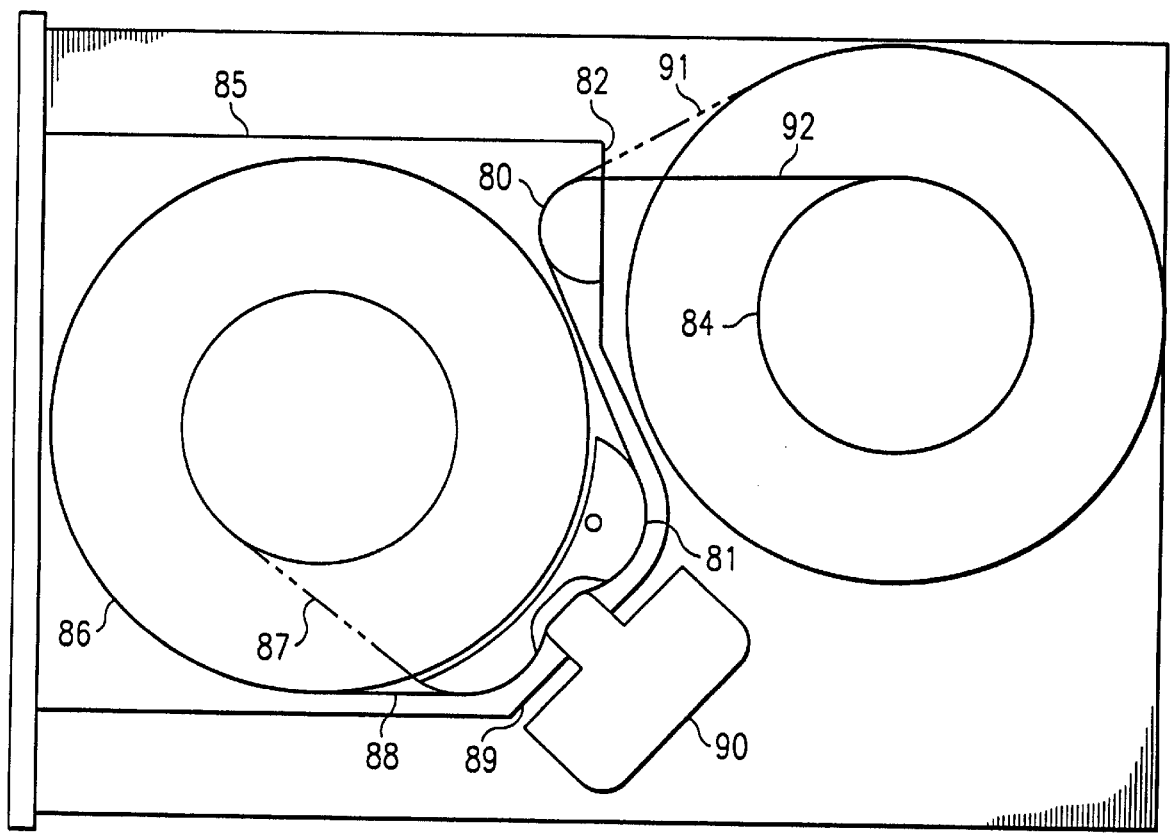
FIG. 7 is a plan diagrammatic view of an alternative embodiment of a single reel tape cartridge of the present invention as inserted into a tape drive.

FIG. 7 illustrates an alternative embodiment of the invention having an isolator 80 between the tape guide and bearing assembly 81 and the aperture 82 to a take up reel 84. The isolator 80 isolates the tape path at the tape guide and bearing assembly 81 from the free end of the length of recording tape as the free end is wound at a take up reel in the drive. The remainder of the cartridge is identical to that of FIGS. 1–6. The tape guide and bearing assembly 81 is positioned within the central cavity of the shell 85 and closely adjacent the maximum outer circumference 86 of the recording tape. The tape guide and bearing assembly 81 defines a tape path 87, 88 for the outermost wrap from the supply reel to the tape guide and bearing assembly, across a first aperture 89 in the shell 85 for interfacing the outermost wrap of the tape with the tape head 90 of the tape drive at the aperture. The isolator 80 isolates the tape path 91, 92 from the tape guide and bearing assembly 81. The isolator 80 is also positioned on the bottom plate, so that the supply reel, the tape guide and bearing assembly 81, and the isolator 80 are aligned with respect to each other. A stable head to tape interface is thus provided at the tape guide and bearing assembly 81 within the tape cartridge, which allows the tape drive to have a small form factor since the only tape path in the tape drive is a short tape path to the take up reel.

Figure 8:
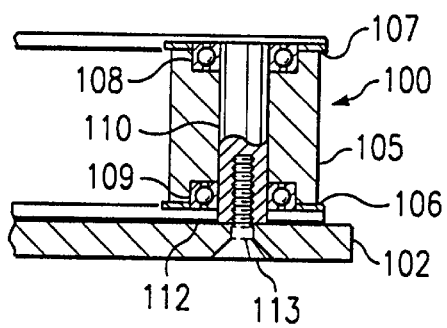
FIG. 8 is a cross sectional view of an alternative embodiment of a tape guide and bearing assembly of the present invention.
Figure 9:
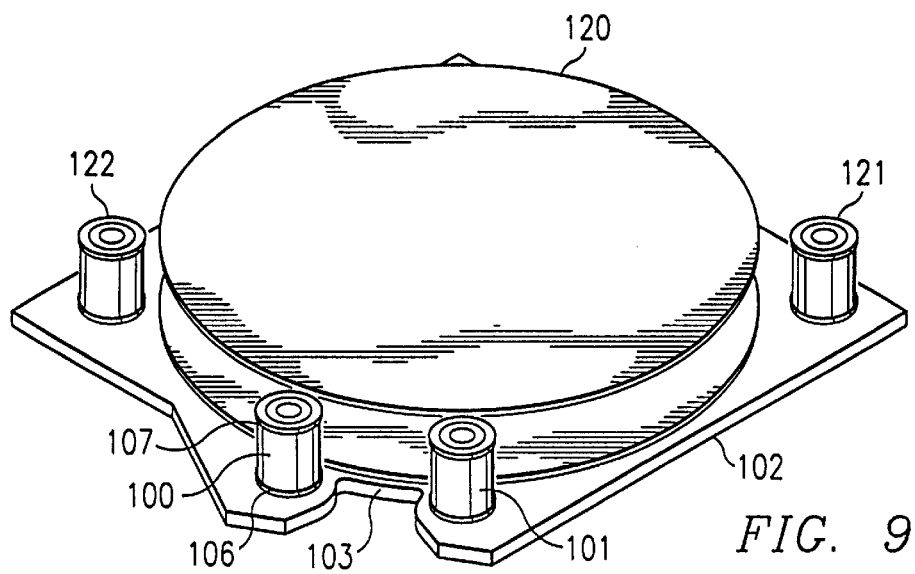
FIG. 9 is an isometric view of the interior of an alternative embodiment of a single reel tape cartridge of the present invention.

The tape guide and bearing assembly 33, 34 or 81 may alternatively employ roller guides as illustrated in FIGS. 8 and 9. Roller guides 100 and 101 of FIG. 9 are mounted on a bottom alignment plate 102 and are positioned on either side of aperture 103 to define a tape path therebetween for interfacing with a tape head of a tape drive. One of the roller guides, for example, roller guide 100 is illustrated in cross section in FIG. 8. A cylindrical bearing 105 having edge guides 106 and 107 is mounted by means of bearings 108 and 109 on a cylindrical center shaft 110. An end 112 of center shaft 110 is precisely positioned in alignment plate 102 and affixed to the alignment plate, for example, by a screw 113. The bearing 105 thereby freely rotates on bearings 108 and 109 about central shaft 110, while edge guides 106 and 107 maintain accurate axial alignment of the tape path with respect to a supply reel 120. The tape paths of the single reel tape cartridge of FIG. 9 may therefore be substantially identical, for example, to that of the single reel tape cartridge of FIGS. 1–6. The roller guide of FIG. 8 may also be employed as the isolator 80 of FIG. 7.

Figure 10:
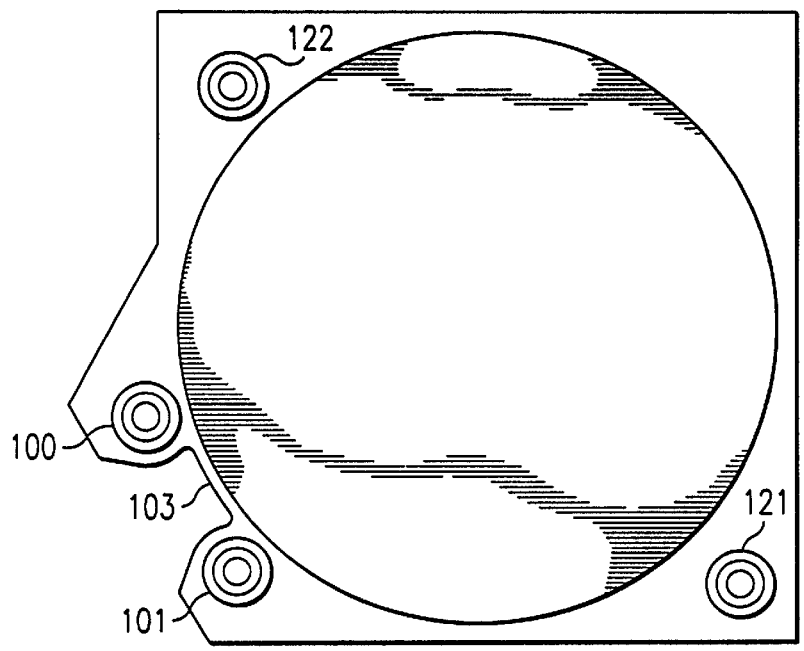
FIG. 10 is a plan diagrammatic view of the single reel tape cartridge of FIG. 9.
Figure 11:
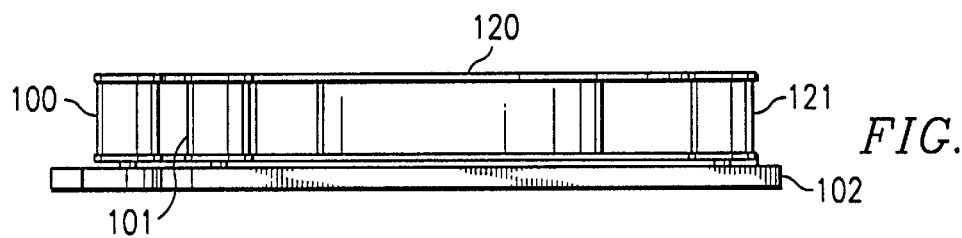
FIG. 11 is a side diagrammatic view of the single reel tape cartridge of FIGS. 9 and 10.

An alternative arrangement of the tape path is also illustrated in FIG. 9, and in FIGS. 10 and 11. Additional roller guides 121 and/or 122 may be provided at the outer periphery of the alignment plate 102 and within the central cavity of the cartridge shell to reduce the length of the wrap of the tape path on the outer wrap of the supply reel 120. The roller guides 121 and/or 122 thereby provide isolation of the tape path, in addition to the isolation provided by supply reel 120, at tape guide and bearing assembly 100 and 101 from the free end of the length of recording tape as the free end is wound at a take up reel in the drive. The isolator roller guides 121 and 122 are also precisely positioned and aligned in the axial direction on the alignment plate 102, so that the supply reel 120, the tape guide and bearing assembly 100, 101 and the isolator roller guides 121, 122, are aligned in the axial direction with respect to each other.

As the result, a stable head to tape interface is provided at the tape guide and bearing assembly 100, 101 within the tape cartridge, which allows an associated tape drive to have a small form factor since the only tape path in the tape drive is a short tape path to the take up reel.

While the preferred embodiments of the present invention have been illustrated in detail, it should be apparent that modifications and adaptations to those embodiments may occur to one skilled in the art without departing from the scope of the present invention as set forth in the following claims.

We claim:

1. A single reel tape cartridge for supporting a length of recording tape for use in a tape drive, said length of recording tape having an attachment end and a free end, said tape drive having a tape head, comprising:
    a shell defining a central cavity and having a first aperture therein for interfacing with said tape head of said tape drive;
    a supply reel positioned within said central cavity of said shell, said supply reel having a central axis, said supply reel for coupling said attachment end of said length of recording tape and for winding said length of recording tape about said central axis in a sequence of wraps from an inner circumference to a maximum outer circumference when said length of recording tape is fully wound on said supply reel;
    a tape guide and bearing assembly positioned within said central cavity of said shell and closely adjacent said maximum outer circumference, said tape bearing assembly facing towards said first aperture in said shell and away from said central axis of said supply reel, said tape guide and bearing assembly defining a tape path for the outermost wrap of said sequence of wraps of said length of recording tape from said supply reel to said tape guide and bearing assembly, across said first aperture in said shell for interfacing said outermost wrap of said length of recording tape with said tape head of said tape drive; and
    an isolator for additionally defining said tape path subsequent to said tape guide and bearing assembly for isolating said tape path at said tape guide and bearing assembly from said free end of said length of recording tape.

2. The single reel tape cartridge of claim 1, wherein said isolator comprises said supply reel, whereby said defined tape path subsequent to said tape guide and bearing assembly extends from said tape guide and bearing assembly back to said supply reel, for isolating said tape path.

3. The single reel tape cartridge of claim 1, wherein said isolator comprises a bearing affixed to said shell.

4. The single reel tape cartridge of claim 1, wherein said shell includes a bottom alignment plate, wherein said supply reel is disposed for rotation on said bottom alignment plate, and wherein said tape guide and bearing assembly and said isolator are positioned on said bottom plate, whereby said supply reel, said tape guide and bearing assembly, and said isolator are aligned with respect to each other.

5. The single reel tape cartridge of claim 4, wherein said isolator comprises a roller guide positioned on said bottom alignment plate, whereby said isolator is aligned with respect to said supply reel and said tape guide and bearing assembly.

6. The single reel tape cartridge of claim 1, wherein said tape drive additionally comprises a threader, wherein said recording tape free end additionally comprises a leader block for interfacing with said threader of said tape drive, wherein said single reel tape cartridge shell additionally comprises a second aperture therein for supporting said leader block when said length of recording tape is fully wound on said supply reel, and wherein said single reel tape cartridge defined tape path additionally extends from said isolator to said second aperture, said second aperture providing an interface with said tape drive to allow said tape drive threader to engage said leader block of said length of recording tape thereat.

7. The single reel tape cartridge of claim 1, wherein said shell comprises four outer side walls in a generally square arrangement, and wherein said supply reel central axis is centrally disposed in said cartridge between said outer side walls, whereby said maximum circumference is closely adjacent said outer walls of said central cavity.

8. The single reel tape cartridge of claim 7, wherein said tape drive additionally comprises a reel drive, and wherein said supply reel additionally comprises a drive coupling at said central axis for removably coupling to said reel drive of said tape drive.

9. The single reel tape cartridge of claim 8, wherein said first aperture of said shell is in a sidewall of said generally square box, said tape guide and bearing assembly comprises a tape guide and bearing on each side of said first aperture of said shell, whereby said defined tape path is at said first aperture for interfacing with said tape head.

10. The single reel tape cartridge of claim 9, wherein said tape guide and bearing assembly comprises fixed tape bearings with compliant tape guides.

11. The single reel tape cartridge of claim 9, wherein said tape guide and bearing assembly comprises roller guides.

12. A single reel tape cartridge for use in a tape drive, said tape drive having a tape head, comprising:
   a length of recording tape having an attachment end and a free end;
   a shell defining a central cavity and having a first aperture therein for interfacing with said tape head of said tape drive;
   a supply reel positioned within said central cavity of said shell, said supply reel having a central axis, said supply reel for coupling said attachment end of said length of recording tape and for winding said length of recording tape about said central axis in a sequence of wraps from an inner circumference to a maximum outer circumference when said length of recording tape is fully wound on said supply reel;
   a tape guide and bearing assembly positioned within said central cavity of said shell and closely adjacent said maximum outer circumference, said tape bearing assembly facing towards said first aperture in said shell and away from said central axis of said supply reel, said tape guide and bearing assembly defining a tape path for the outermost wrap of said sequence of wraps of said length of recording tape from said supply reel to said tape guide and bearing assembly, across said first aperture in said shell for interfacing said outermost wrap of said length of recording tape with said tape head of said tape drive; and
   an isolator for additionally defining said tape path subsequent to said tape guide and bearing assembly for isolating said tape path at said tape guide and bearing assembly from said free end of said recording tape.

13. The single reel tape cartridge of claim 12, wherein said isolator comprises said supply reel, whereby said defined tape path subsequent to said tape guide and bearing assembly extends from said tape guide and bearing assembly back to said supply reel, for isolating said tape path.

14. The single reel tape cartridge of claim 12, wherein said isolator comprises a bearing affixed to said shell.

15. The single reel tape cartridge of claim 12, wherein said shell includes a bottom alignment plate, wherein said supply reel is disposed for rotation on said bottom alignment plate, and wherein said tape guide and bearing assembly and said isolator are positioned on said bottom plate, whereby said supply reel, said tape guide and bearing assembly, and said isolator are aligned with respect to each other.

16. The single reel tape cartridge of claim 15, wherein said isolator comprises a roller guide positioned on said bottom alignment plate, whereby said isolator is aligned with respect to said supply reel and said tape guide and bearing assembly.

17. The single reel tape cartridge of claim 12, wherein said tape drive additionally comprises a threader, wherein said single reel tape cartridge recording tape free end additionally comprises a leader block for interfacing with said threader of said tape drive, wherein said single reel tape cartridge shell additionally comprises a second aperture therein for supporting said leader block when said length of recording tape is fully wound on said supply reel, and wherein said single reel tape cartridge defined tape path additionally extends from said isolator to said second aperture, said second aperture providing an interface with said tape drive to allow said tape drive threader to engage said leader block of said length of recording tape thereat.

18. The single reel tape cartridge of claim 12, wherein said shell comprises four outer side walls in a generally square arrangement, and wherein said supply reel central axis is centrally disposed in said cartridge between said outer side walls, whereby said maximum circumference is closely adjacent said outer walls of said central cavity.

19. The single reel tape cartridge of claim 18, wherein said tape drive additionally comprises a reel drive, and wherein said supply reel additionally comprises a drive coupling at said central axis for removably coupling to said reel drive of said tape drive.

20. The single reel tape cartridge of claim 19, wherein said first aperture of said shell is in a sidewall of said generally square box, said tape guide and bearing assembly comprises a tape guide and bearing on each side of said first aperture of said shell, whereby said defined tape path is at said first aperture for interfacing with said tape head.

21. The single reel tape cartridge of claim 20, wherein said tape guide and bearing assembly comprises fixed tape bearings with compliant tape guides.

22. The single reel tape cartridge of claim 20, wherein said tape guide and bearing assembly comprises roller guides.

* * * * *